United States Patent Office 3,437,292
Patented Apr. 8, 1969

3,437,292
AUTOMATIC AIRCRAFT THROTTLE CLOSURE SYSTEM FOR FLARE
Leonard M. Greene, Chappaqua Town, N.Y., assignor to Safe Flight Instrument Corporation, a corporation of New York
Filed Nov. 21, 1966, Ser. No. 595,703
Int. Cl. B64d *31/00*
U.S. Cl. 244—77                          6 Claims

ABSTRACT OF THE DISCLOSURE

An automatic aircraft throttle closure furnishes upon issuance of a flare initiate signal a throttle retard bias signal and in opposition thereto an inertial deceleration signal, the difference signal indicating and/or controlling correct thrust action during flare so as to initiate and maintain deceleration during flare until touchdown. A touchdown controlled rapid retard signal quickly retards the throttles. This latter signal is prevented from being effective if falsely generated before the flare initiate signal issues.

---

Figure 1:
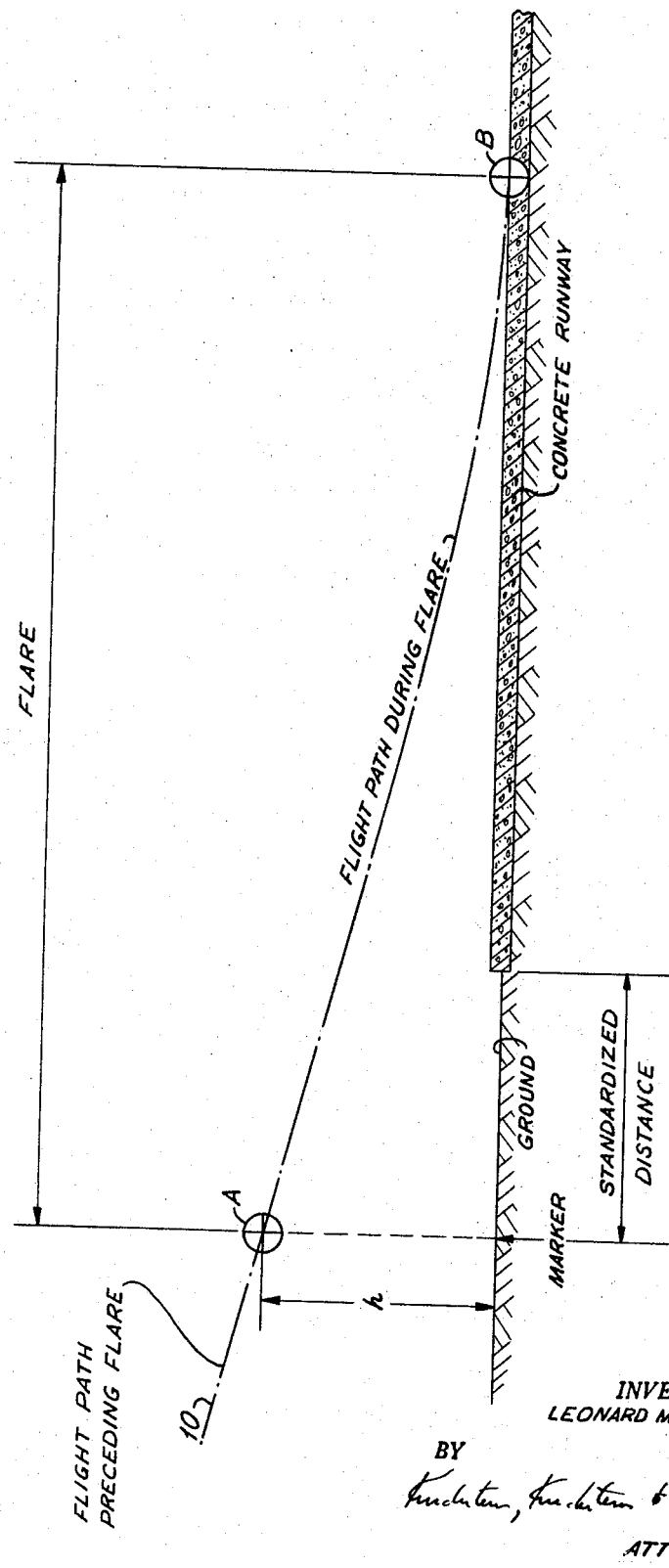

This invention relates to an automatic aircraft throttle closure system for flare.

The final portion of an aircraft's descent during landing is referred to as the "flare." Immediately prior thereto, the aircraft has made a "landing approach" during which it descended at a substantially constant speed to a well defined position, both vertically and horizontally with respect to the runway. After this final approach the speed of the aircraft must be reduced in a safe and orderly manner until touchdown, that is to say, contact with the runway. At touchdown the thrust of the aircraft must be quickly reduced to zero and in many cases reversed as soon as possible to allow the aircraft to be maneuvered on the ground.

During landing approach and prior to flare, the airplane moves with respect to the local air mass at a predetermined safe air speed in excess of $V_S$, the stall speed, along a flight path that leads to the runway touchdown point. A typical approach flight path is along a glide slope of approximately 3° to the runway. The resulting vertical speed of the aircraft, i.e., its rate of vertical descent, will usually be in the range of 500 to 800 feet per minute downward. Quite apparently, if the aircraft were to continue along this path and at its concomitant downward vertical speed until touchdown, a hard landing would result which would be unacceptable for either freight or passenger purposes and would impose undue stresses on the aircraft frame and landing gear. Therefore, it is customary at a point prior to touchdown to "flare" the aircraft, which is to say, to gradually reduce the flight path angle to the runway and at the same time to gradually reduce the forward air speed of the aircraft.

Flare may be initiated at a predetermined attitude above the runway. Upon flare being initiated, the pitch attitude of the aircraft is reduced, i.e., the nose down attitude is reduced, in order to reduce the flight path angle to the runway. The decreased pitch attitude will also tend to decrease the forward speed of the aircraft with respect to the local air mass if the power for forward thrust remains unchanged. If power is being controlled automatically, as it often will be during the glide slope portion of the landing path, to maintain constant speed or constant lift, this power must be prevented from increasing during the flare and either should remain unchanged, or, optimally, gradually reduced to allow the air speed to decrease. Of course, power must not be reduced to the extent that speed will decrease to stalling speed or else the aircraft will continue its high sink rate (rate of descent) and make a hard landing.

It is the object of my present invention to provide a flare throttle closure system which will control throttle closure during flare in a safe and logical manner.

More specifically, it is an object of my invention to provide a flare throttle closure system of the character described which will bleed off speed during flare so as to reduce landing speed.

Other objects of my invention in part will be obvious and in part will be pointed out hereinafter.

My invention accordingly consists in the features of construction, combinations of elements and arrangements of parts which will be exemplified in the system hereinafter described and of which the scope of application will be indicated in the appended claims.

Figure 2:
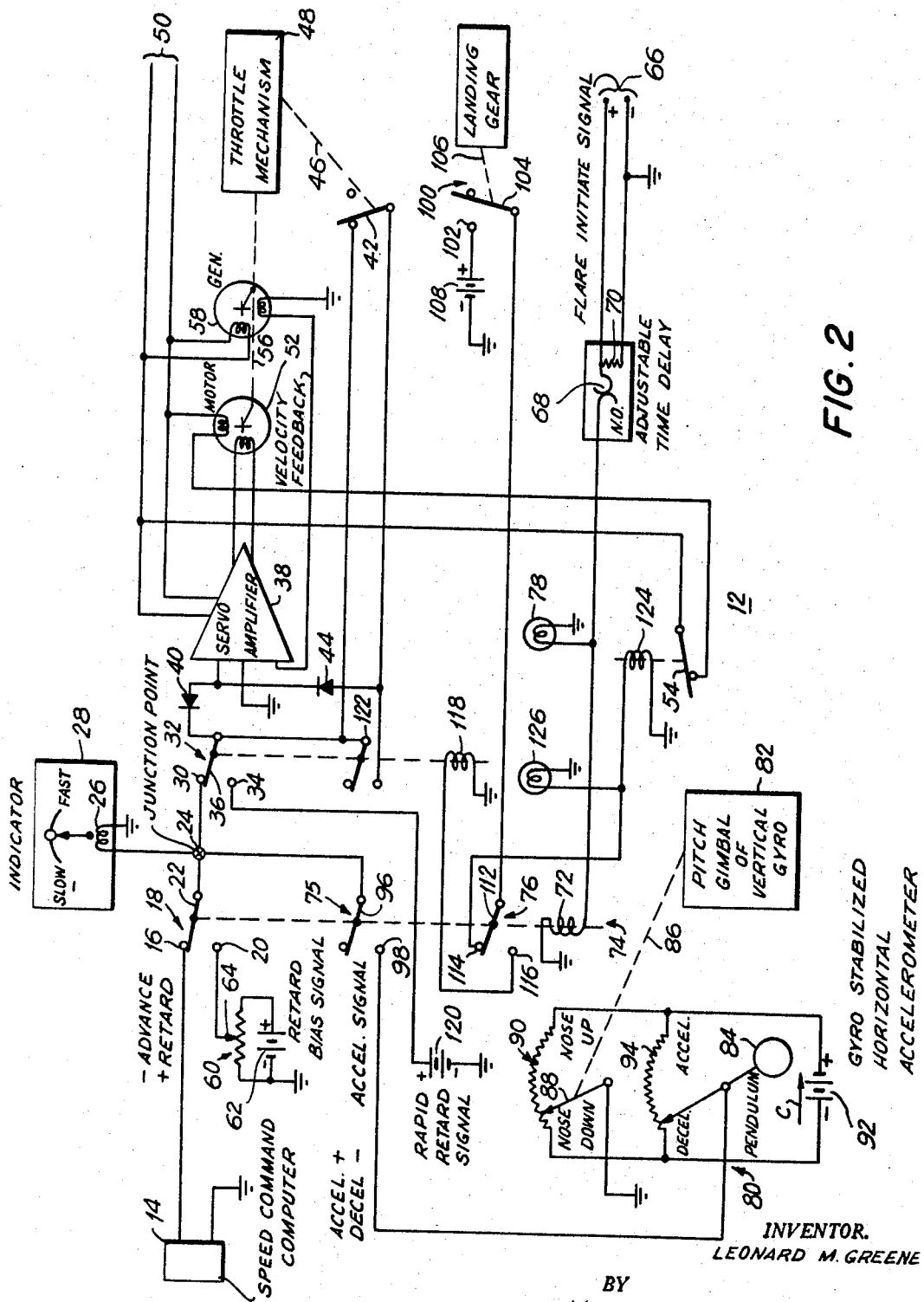

In the accompanying drawings in which is shown one of the various possible embodiments of my invention, FIG. 1 is a profile of a flight path during flare; and FIG. 2 is a schematic circuit diagram of an airplane instrument embodying my present invention, for furnishing a director signal to indicate or control correct thrust action during a flare maneuver.

In general, I carry out my invention by providing a means which furnishes a throttle closing (retard) bias signal, the same constituting a reference signal indicative of a preselected throttle closing bias. I further provide a means for furnishing a signal responsive to forward inertial acceleration independent of the pitch angle of the aircraft which latter signal in response to inertial deceleration of the aircraft is in a sense to oppose the reference throttle closing bias signal. These two signals, to wit, the reference throttle closing bias signal and the forward intertial acceleration signal, are compared, as, for instance, in a comparator or computer, or simply by bucking the two signals against one another at a junction in a simple network, thereby furnishing a difference, i.e., error, signal. The difference signal is a director signal which is used to indicate and/or control correct thrust action during a flare maneuver.

It will be appreciated that the system will come to a balance (furnish a zero director signal) when the position of the throttle as controlled by the pilot obeying the director signal, or as controlled by the automatic pilot regulated by the director signal, is just right to effect a deceleration signal of an appropriate magnitude to negate, i.e., balance, the bias signal. This will result in the desired speed reduction in the desired time.

Where during the flare maneuver the local air mass is calm or constitutes a steady wind, a minimum of throttle control activity will take place. The throttles will be positioned as necessary to keep the deceleration constant as the airplane approaches the ground and the ground effect increases.

An important function of my present invention is to properly control the throttles where there is wind shear, change in wind direction or gustiness. Gusts can be considered transient cases of wind shear in which large wind speed gradients or changes in wind direction occur along the flight path as the aircraft descends. From the standpoint of throttle, i.e., thrust, control, changes in wind direction have the same effect as changes in wind speed, the vector of the wind in the direction of the line of flight being the only component that has to be considered for control of the throttles.

Since the aircraft is flying in the local air mass, its speed over the ground is affected by the speed of movement of the local air mass. When the flare maneuver is initiated manually or by instrumentation, the aircraft is flying at a predetermined air speed corresponding to a predetermined ground speed established by the existing wind speed at the altitude of the flare initiate point. My system will reduce this ground speed at a desired predetermined rate regardless of changes in wind speed as the airplane proceeds along the flare portion of the flight path. By sensing the forward inertial deceleration or acceleration of the aircraft as the air speed changes, and by applying this information to the comparator, e.g., a computer, which supplies an output as a director signal to an indicator or to the automatic throttle control system, the speed of the aircraft with respect to the ground may be caused to be reduced at a uniform rate. This ground speed reduction rate or deceleration is determined by the value of the preset throttle closing bias reference signal, which when combined with the inertial deceleration signal, results in a null director signal to the indicator or to a throttle servo control system only when the aircraft is decelerated with respect to the ground at the preselected predetermined value. Thereby, upon contact with the runway at touchdown the aircraft ground speed will be a decrement resulting from a predetermined deceleration below the aircraft ground speed at the flare initiate point, even though the indicated air speed may have changed by a much greater amount.

Preferably also provided with my system is a means which upon touchdown, for instance upon contact between the landing gear and the ground, will furnish a signal that will cause the throttles to be closed as rapidly as possible. Where such an automaitc throttle closure means is employed it is desirable also to include for safety purposes a means to disengage the automatic throttle system automatically, if, through a malfunction, the ground contact signal is present before the flare initiate signal first comes on. This minimizes the possibility of a rapid throttle closure occuring at any time other than that at which a wheel contacts a runway.

Referring now in detail to the drawings, in FIG. 1 there is illustrated a profile of a flight path immediately prior to and during flare. The section 10 indicates the portion of the landing approach immediately prior to flare. The point A defines the end of the landing approach prior to flare. This is a decision point, since the pilot at such time has only two alternatives, either to land or to make a balked landing take-off, i.e., to go around for another landing. This point is defined by various navigational aids well known to the art. The aircraft must be lined up with the runway, as shown on the localizer and glide slope radio beams. It must be at some specific altitude, for instance, $h$ as shown in FIG. 1 is equal to 70 feet. Also, the air speed must be correct. The point must be a standardized distance before the start of the runway. If all of the predetermined conditions are met, the aircraft may be placed into a flare maneuver, that is to say, flare may be started.

Flare will be started by instituting a flare initiate signal. The flare initiate signal may be instituted manually, for instance, by the pilot pushing a button, or if the aircraft is equipped with an automatic landing apparatus, such apparatus may deliver the signal to my automatic flare throttle closure system. Either the manual or automatic signal is referred to as a "flare initiate signal." Upon receipt of this signal my flare throttle closure system will command the pilot through an indicator, or will command an automatic throttle system to close the throttles in a manner which subsequently will be described and in accordance with the concepts of my invention.

Point B in FIG. 1 is the touchdown or ground contact point. Upon contact with the runway a signal from the landing gear of the aircraft is delivered to the automatic flare throttle system which will cause the throttles to be closed as rapidly as possible.

In FIG. 2 the reference numeral 12 denotes an airplane instrument, to wit, an automatic flare throttle closure system in accordance with my present invention. The line of flight of the aircraft in which the instrument is carried is indicated by the arrow C. The head of the arrow indicates the forward direction of flight. This is the line of flight of the aircraft with respect to its local air mass.

The instrument includes a speed command computer 14 of a conventional type. Such a speed command computer is shown, for example, in my United States Letters Patent No. 3,043,540 issued July 10, 1962 for Airplane Instruments, in my United States Letters Patent No. 3,285,067 issued Nov. 15, 1966 for Airplane Instrument for Furnishing a Deceleration-Modified Director Signal to Indicate or Control Corrective Action for Offsetting Decrease in Headwind During Landing Approach and in my copending application, Ser. No. 437,055, filed Mar. 4, 1965 now Patent No. 3,327,972 for Airplane Instrument for Furnishing a Bias Signal to Offset the Effects of Forward Components of Gust During Landing Approach. One of the output terminals of the speed command computer is connected to ground and the other to a contact 16 of a single-pole double-throw transfer switch 18 having a second contact 20 and a blade 22 movable between said contacts. The computer 14 supplies a DC signal to the contact 16 which signal is negative with respect to ground when the computer determines that it is desirable to advance the throttles of the aircraft and is positive when the computer determines that it is desirable to retard the throttles of the aircraft. The blade 22 is connected by a lead wide to a junction point 24 which, for reasons that later will be apparent, might also be referred to as a comparator, or a combining or addition point.

From the junction point signals travel outwardly along two paths. One of these paths is to a meter (indicator) or the like and the other to a throttle arrangement which is to say a servo arrangement for controlling the throttles.

Specifically, a lead wire extends from the junction point 24 to one terminal of an actuating coil 26 of a null meter 28 the other terminal of which is connected to ground. The null meter is such as described in my aforesaid patents, having a needle which is at a zero null point when the computer determines that the throttles are correctly set and which swings to a slow or a fast side when the computer determines respectively that the aircraft is going too slow or too fast. The null meter is read by the pilot who manually controls the throttles in accordance with the command director indication furnished by the null meter. If the meter reads "fast" the pilot retards the throttles, and if "slow" the pilot advances the throttles.

Another lead wire runs from the junction point 24 to a contact 30 of a single-pole double-throw switch 32. The switch 32 includes said contact 30, a second contact 34 and a blade 36 which swings between the contacts 30, 34. The blade 36 is connected to a control terminal of a servo amplifier 38. This connection is effected through one path including a rectifier 40 oriented to pass negative (throttle opening) signals to the servo amplifier. A second path connecting the blade 36 to the servo amplifier input terminal includes a normally closed switch 42 and a second rectifier 44, the latter being oriented to pass positive (throttle closing) signals to the servo amplifier from the blades 36.

The switch 42 is connected by a mechanical linkage 46 to a throttle mechanism 48. Said linkage will open the switch 42 when the throttles reach a low operating limit below which it is desired not to reduce the throttles and therefore engine output in flight. This low limit corresponds to a flight idle position of the throttles at which they are delivering substantially no thrust. However, at this low limit the engines still are operating at a thrust level such that they can quickly respond to an increase in throttle position. If the engines are permitted to operate below this limit their response to an increase in throttle position, i.e., advance in throttle, will be sluggish and therefore it is not safe in flight to pass any throttle closing signal which will shut down the throttles below such low limit.

The servo amplifier 38 is energized from a power source

50. The output from the servo amplifier is furnished to a control coil of a servo motor 52 of the field coil of which is energized from the power source 50 via a normally closed switch 54. The output shaft 56 of the servo motor 52 drives the throttle mechanism 48.

As is conventional for servo motor control the output shaft of the servo motor also drives a rate generator 58 having field coil energized from the power source 50. The output coil of the generator is connected to ground and by a feedback connection to the servo amplifier 38 to complete the servo loop.

As thus far described, the instrument 12 is quite conventional. It operates under the control of a signal issued by the speed command computer. If the computer generates a zero null signal, the indicator 28 will have its needle at zero position, thereby instructing the pilot to take no corrective action for control of the throttles. Similarly, the zero signal fed to the servo amplifier will not move the throttles in either an advance or in a retard direction.

If the speed command computer issues a fast signal, that is to say, a positive signal, the indicator needle will swing to the positive fast side instructing the pilot, if he is in command of the aircraft, to retard the throttles, or regulating the servo amplifier, if the aircraft is under instrument control, so as to have the throttle mechanism 48 retard the throttles. Of course, they cannot retard the throttle beyond the point where the throttle mechanism opens the switch 42.

If the speed command computer issues a slow signal, that is to say, a negative signal, the meter needle will swing to the negative slow side, instructing the pilot to advance the throttles or instructing the servo amplifier, if the aircraft is under instrument control, to have the throttle mechanism 48 advance the throttles.

The foregoing operation of the system under the control of the speed command computer takes place during landing approach prior to flare while the aircraft is on its glide slope path, the speed command computer at this time furnishing a target signal appropriate to a landing approach preceding flare. At such time (prior to the initiation of flare) the blade 22 is closed on the contact 16 and the blade 36 is closed on the contact 30. The switches 42 and 54 are closed. The balance of the mechanism now to be described functions after a flare initiate signal is issued, the effect of which will be, inter alia, to disconnect the speed command computer from its control of the null meter 28 and of the servo amplifier 38 by breaking the contact between the blade 22 and contact 16.

My instrument 12 further includes a means for supplying a throttle retard (herein positive) bias signal of an adjustable preselected value. Said means includes a potentiometer winding 60 across which the terminals of a battery 62 are connected. The negative terminal of the battery is grounded. The potentiometer tap 64 is connected by a lead wire to the contact 20. Hence, when the potentiometer is in any position between two extremes of its winding, a positive (retard) bias signal will be suppled to the contact 20. This signal, if applied to the indicator 28 or to the amplifier 38 by itself, will indicate that the aircraft is going too fast and will direct the pilot or the automatic throttle control mechanism to retard the throttles. Thus, the signal furnished by the contact 20 is, as indicated above, always a throttle retard bias signal.

A flare initiate signal is applied across a pair of terminals 66. This signal may be derived by having the pilot close a normally open switch to supply potential to said terminals, or the signal may be supplied from a computer other than a speed command computer which furnishes the signal when the aircraft is at the proper height.

As indicated, the flare initiate signal applies a positive potential to one of the terminals and a negative potential to the other. This is merely by way of example, since the flare initiate signal also can be of an AC nature. The negative terminal is grounded. The positive terminal is connected by a lead wire to a normally open switch 68. This switch is a time delay switch, preferably an adjustable time delay switch, such, for example, as a switch having a screw adjustable bimetallic blade carrying a contact which is normally spaced from a fixed contact. In heat transfer relationship with the bimetallic blade is a resistor 70 which is connected across the terminals 66. When a flare initiate signal is applied to the terminals 66, it will heat the resistor 70 which in turn will heat the bimetallic blade of the switch 68. Said blade is so constructed that upon a temperature rise it will flex toward closed position with the fixed contact. After an adjustable period of time which may vary from about 0 to 5 seconds, the blade closes the contacts and is latched closed for the flare maneuver.

Closing of the switch 68 passes current from the positive terminal 66 to an actuating coil 72 of a flare initiate relay 74. Said relay controls three switches, the first of which is the transfer switch 18, the second two being a switch 75 and a switch 76. A flare initiate pilot lamp 78 is connected to be lit when the coil 72 is energized.

The purpose of the adjustable time delay feature of the normally open switch 68 is to enable the same instrument 12 to be used on a wide variety of aircraft by delaying the throttle closure command for an adjustable period of a few seconds after the flare initiate signal comes on.

My instrument 12 further includes a forward inertial accelerating sensing means 80 which will supply a signal that is a function of such forward inertial acceleration. Said means includes a pitch angle sensing means 82 and a pendulum 84.

The pitch angle sensing means constitutes the pitch gimbal of a vertical gyro and is detailed in my aforesaid United States Letters Patent No. 3,285,067.

The pendulum 84 is mounted to turn about an axis which is horizontal when the airplane is in level flight, and is so oriented that the pendulum swings in a fore and aft vertical plane at such time. The pendulum senses both pitch angle and forward inertial acceleration. The difference between the pendulum angle and the pitch angle is a measure of forward inertial acceleration independent of pitch angle which is the variable to which the forward inertial sensing means is responsive.

The pitch angle sensing means 82, through a mechanical linkage 86, rotates a movable tap 88 of a potentiometer 90, the resistance winding of which is fixed to the frame of the airplane in a plane which is vertical and fore and aft when the aircraft is in level flight. The opposite ends of the resistance winding of the potentiometer 90 are connected to a battery 92 or other suitable source of DC potential. The battery connections and movement of the tap of the potentiometer 90 are such that the tap is in the center of the resistance winding when the aircraft is level and the tap moves toward the positive end of the winding when the aircraft nose pitches up, the tap moving toward the negative end of the winding when the aircraft nose pitches down, as indicated in FIG. 2.

The pendulum 84 drives a movable tap of another potentiometer 94 likewise having the terminals of its resistance winding connected to the battery 92. The pendulum is so oriented that its tap will move toward the negative side of the resistance winding of the potentiometer 94 when the aircraft decelerates and toward the positive terminal of said winding when the aircraft accelerates, being at the center of the resistance winding when neither acceleration nor deceleration is being experienced. The tap of the potentiometer 90 is connected to ground. Hence, the potential difference between the taps of the potentiometers 90, 94 will be a measure of forward inertial acceleration independent of pitch angle.

The switch 75 constitutes a blade 96 which, like the blade 22, is shifted upon energization of the actuating coil 72 of the flare initiate relay 74. The switch 75 also includes a contact 98 connected to the tap of the potentiometer 94.

When the relay 74 is idle the blade 18 is in engagement with the contact 16 and the blade 96 is out of engagement with the contact 98. When the relay 74 is energized subsequent to supplying the flare initiate signal and upon closure of the normally open time delay switch 68, the blade 18 will engage the contact 20 and the blade 96 will engage the contact 98.

The blade 96 is connected by a lead wire to the junction point 24, so that subsequent to issuance of the flare initiate signal two signals will be supplied to the junction 24. The first of these will be a signal from the means for supplying a throttle retard bias signal, this signal being positive to command a reduction of throttle speed and the second signal being supplied from the forward inertial accelerating sensing means. This second signal will, upon the occurrence of forward inertial deceleration, be in a sense to oppose the signal supplied by the throttle retard bias signal. Hence, this signal will be negative when the airplane is decelerating in a forward sense.

The two signals are combined, i.e., compared, at the junction point 24, and the resultant error signal travels both to the null indicator 28 and to the servo amplifier 38 where the signal will function in the manner previously described in connection with the speed command computer. That is to say, if the combined signal, which also might be referred to as an error or difference signal, is negative, it will command an advance of the throttle, and if positive will command a retarding of the throttle.

The foregoing are the principal components of my instrument 12. The remaining components, subsequently to be described, are refinements thereof, adding certain desirable functions. Hence, it is appropriate at this stage to outline the operation of the aforesaid components.

When the aircraft is in its landing approach mode prior to the issuance of a flare initiate signal, the indicator and the throttle mechanism are under the control of the speed command computer 14. When the flare initiate signal is instituted and after the time delay switch 68 is closed so that the instrument is in its flare mode, the speed command computer is disconnected by energization of the relay 74 and instead there are furnished to the junction point 24 two signals, the first being a throttle retard bias signal of a preselected amount which is always positive so as to command retard in the indicator 28 and to the throttle mechanism. The second signal is from the forward inertial accelerating sensing means.

When the switch 68 first closes, and assuming that the forward inertial accelerating sensing means has a zero output, the junction 24 will be driven positive, that is to say, it will be supplied with a positive retard bias signal which will command a retarding movement of the throttles through the indicator 28 and the servo amplifier 38. The consequent reduction in thrust of the aircraft will decelerate the aircraft in a forward direction. Such deceleration will be sensed by the forward inertial accelerating sensing means which in turn will furnish a negative signal responsive to this deceleration. When the negative signal balances the positive signal from the potentiometer 60 the junction 24 will be at zero and there will be no deceleration command furnished by the indicator 28 or the servo amplifier 38. Thus, in a comparatively short period of time after issuance of the flare initiate signal the aircraft will fly and will continue to fly at a substantially constant deceleration which has been selected to reduce the speed from point A to point B by a predetermined amount.

If there is any change in the speed of the local air mass due either to change in wind direction or wind velocity or to wind shear or to gustiness, the component thereof in a fore and aft direction will be sensed by the forward inertial acceleration sensing means and will be reflected in the command signal issuing from the junction point 24 to the meter 28 and the servo amplifier 38. Thereby, the aircraft will, on closure of the time delay switch 68, enter upon a deceleration mode which will reduce the air speed and ground speed from the point at which the flare initiate signal was issued to the point of touchdown.

My instrument further desirably includes means for rapidly retarding the throttles upon touchdown. To this end I provide a normally open switch 100 having a contact 102 and a blade 104. The blade is connected by a mechanical linkage 106 to the landing gear in such fashion that when the wheels of the landing gear touch the ground and begin to bear weight, the blade 104 will close against the contact 102. A battery 108 or other suitable source of electric energy is connected between the contact 102 and ground. The blade 104 is connected to the switch 76 which is of the single-pole double-throw type. Said switch 76 includes a blade 112 and a pair of contacts 114, 116. The blades 104, 112 are electrically interconnected. The blade 112 is against the contact 114 when the flare relay 74 is idle and is against the contact 116 when the relay 74 is actuated. The contact 116 is connected to the actuating coil of a touchdown relay 118.

When the apparatus is in its flare mode and the flare relay 74 is actuated, the battery 108 prepares the touchdown relay 118 for energization. The touchdown relay 118 controls the switch 32 previously described. When the touchdown relay 118 is idle, the blade 36 engages the contact 30 of the switch 32. Upon the wheels touching down, the relay 118 becomes actuated providing that the apparatus is in its flare initiate mode. Hence, the blade 32 at this time engages the contact 34. The contact 34 has positive potential applied thereto by a battery 120. It thus will be apparent that when the wheels touch the ground at such time as the apparatus is in its flare mode a positive signal is applied to the blade 36. This positive signal is strong enough to rapidly drive the servo amplifier in a throttle retard direction so as to quickly close the throttles, thereby chopping off power which is desirable once the wheels touch down.

The touchdown relay 118 also controls a second switch 122. This switch is of the normally open type and when closed upon actuation of the relay 118 shunts the normally closed switch 42, thus allowing the throttles to be closed beyond the point where the switch 42 would be opened when the throttles reach their low operating limit. It will be appreciated that although it is not desirable to permit the throttles to be closed too far when the aircraft is in flight, specifically so far that the engines will no longer be quickly responsive to an advance in throttle, this factor no longer applies once the aircraft wheels have touched the ground, whereupon the throttles may be closed down as far as possible and the thrust even reversed.

It will be understood that it would be undesirable to chop the engines, i.e., rapidly retard the throttles prior to flare, when the aircraft is under the control of the speed command computer, for instance, during landing approach, as this might cause a crash. Hence, when the aircraft is not in its flare mode and the blade 112 is against the contact 114, an alternate path is provided for a signal from the touchdown switch 100. A signal from this switch ought not issue while the aircraft is in its landing approach mode short of flare because the wheels at this time obviously are not in contact with the ground. Nevertheless, the switch 100 may be faulty or some other mechanical trouble may have occurred, causing the switch 100 to engender a false touchdown signal when the apparatus is not in its flare mode. When this occurs, the signal from the battery 108 is transmitted from the blade 104 to the blade 112, thence to the contact 114 and from it to a cut-out relay 124 which opens the switch 54. Opening of this switch de-energizes the motor 52 and idles the servo control of the throttle mechanism. Hence, if the switch 100 faultily issues a touchdown signal during landing approach, prior to flare, the automatic throttle control for the throttle mechanism 48 will be de-activated and the pilot will have to take over manual control of the throttle for landing of the aircraft. A pilot light 126 is energized when the relay 124 is energized so as to warn the pilot of the fault.

It thus will be seen that I have provided a system which achieves the several objects of my invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described my invention, I claim as new and desire to secure by Letters Patent:

1. An automatic aircraft throttle closure apparatus for flare for use in conjunction with an aircraft wherein a flare initiate signal is supplied at the end of landing approach, said apparatus comprising: means furnishing a throttle retard bias signal of a predetermined value, a forward inertial acceleration sensing means furnishing a signal independent of pitch angle the sense of which upon forward inertial deceleration is opposite to said throttle retard bias signal, means comparing said signals and supplying a difference signal, a throttle director utilization mechanism and means operable upon said flare initiate signal being supplied to transmit the difference signal to the throttle director utilization mechanism.

2. An apparatus as set forth in claim 1 wherein the means furnishing the throttle retard bias signal is adjustable as to the value of the signal supplied.

3. An apparatus as set forth in claim 1 wherein the means operable to transmit the difference signal to the throttle director utilization mechanism upon the flare initiate signal being supplied includes a time delay means.

4. An apparatus as set forth in claim 1 wherein the means operable to transmit the difference signal to the throttle director utilization mechanism upon the flare initiate signal being supplied includes an adjustable time delay means.

5. An apparatus as set forth in claim 1 wherein a speed command computer is included to furnish a director signal to the throttle director utilization mechanism before the flare initiate signal is supplied and where upon supplying said flare intiate signal the signal from the speed command computer is disconnected from the throttle director utilization mechanism.

6. An apparatus as set forth in claim 1 in which the throttle director utilization mechanism includes a servo system driving a throttle, and wherein means further is included to prevent retardation of the throttle by the throttle director mechanism beneath a low operating limit prior to touchdown.

References Cited

UNITED STATES PATENTS

| 2,321,582 | 6/1943 | Crane et al. | 244—77 |
| 2,593,910 | 4/1952 | Morris et al. | |
| 2,663,520 | 12/1953 | Moseley | 244—77 |
| 3,283,573 | 11/1966 | Bishop et al. | 244—77 X |
| 3,285,067 | 11/1966 | Greene | 244—77 X |
| 3,295,796 | 1/1967 | Gaylor | 244—77 |

MILTON BUCHLER, *Primary Examiner.*

JEFFREY L. FORMAN, *Assistant Examiner.*

U.S. Cl. X.R.

244—81